(12) United States Patent
Bastide et al.

(10) Patent No.: US 9,983,768 B2
(45) Date of Patent: May 29, 2018

(54) TABULATED DATA SELECTION

(71) Applicant: INTERNATIONAL BUSINESS MACHINES CORPORATION, Armonk, NY (US)

(72) Inventors: Paul R. Bastide, Boxford, MA (US); Sean Callanan, Dublin (IE); Mark Gargan, Dublin (IE); Fred Raguillat, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days. days.

(21) Appl. No.: 15/298,541

(22) Filed: Oct. 20, 2016

(65) Prior Publication Data
US 2018/0113571 A1   Apr. 26, 2018

(51) Int. Cl.
*G06F 17/24* (2006.01)
*G06F 3/0482* (2013.01)
(Continued)

(52) U.S. Cl.
CPC ........ *G06F 3/0482* (2013.01); *G06F 3/04883* (2013.01); *G06F 17/245* (2013.01); *G06F 17/3053* (2013.01); *G06F 17/30292* (2013.01); *G06F 17/30477* (2013.01); *G06K 9/2054* (2013.01)

(58) Field of Classification Search
CPC .............................. G06F 17/245; G06F 17/246
See application file for complete search history.

(56) References Cited

U.S. PATENT DOCUMENTS 6,185,582 B1 * 2/2001 Zellweger ............. G06F 17/246
715/212
9,043,722 B1 * 5/2015 Holt .................... G06F 3/04842
715/781

(Continued)

FOREIGN PATENT DOCUMENTS

EP         1 603 052 A1   12/2005
WO   WO 2015/094827 A1    6/2015

OTHER PUBLICATIONS

Excel Corporation, "Selecting Cells Related to a Formula in the Active Cell", The Excel Skinny Blog, https://support.offic.com/en-us/article/Select-cells-ranges-rows-or-columns-on-a-worksheet-23f64223-2b6b-8688-248355f10fa9, published Feb. 16, 2013 (3 pages).

(Continued)

*Primary Examiner* — Asher D Kells
(74) *Attorney, Agent, or Firm* — Nicholas Bowman, Esq.; Kevin P. Radigan, Esq.; Heslin, Rothenberg, Farley & Mesiti, P.C.

(57) ABSTRACT

A computer-implemented method, system, and program product for selecting tabulated data are provided, which include: displaying a tabulated data structure on a computer display, the tabulated data structure including a plurality of data fields; receiving a user input indicative of a selection of one of the data fields; searching the tabulated data structure to generate at least one set of data fields, the data fields in each set sharing a relationship with the user-selected data field; and highlighting the at least one set of data fields in the displayed tabulated data structure, in which each of the highlighted sets of data fields is user-selectable.

25 Claims, 8 Drawing Sheets

(51) Int. Cl.
  *G06F 3/0488* (2013.01)
  *G06F 17/30* (2006.01)
  *G06K 9/20* (2006.01)

(56) References Cited

U.S. PATENT DOCUMENTS

| | | | |
|---|---|---|---|
| 2002/0023105 A1* | 2/2002 | Wisniewski | G06F 17/246 715/212 |
| 2006/0048044 A1* | 3/2006 | Genesereth | G06F 17/246 715/213 |
| 2006/0074866 A1* | 4/2006 | Chamberlain | G06F 17/246 |
| 2006/0080594 A1* | 4/2006 | Chavoustie | G06F 17/246 715/218 |
| 2006/0080595 A1* | 4/2006 | Chavoustie | G06F 17/246 715/213 |
| 2007/0050322 A1* | 3/2007 | Vigesaa | G06F 17/246 |
| 2007/0136406 A1* | 6/2007 | Softky | G06F 17/246 708/200 |
| 2007/0180417 A1* | 8/2007 | Eischeid | G06F 17/246 716/118 |
| 2007/0250765 A1 | 10/2007 | Chen et al. | |
| 2014/0372854 A1 | 12/2014 | Otero et al. | |

OTHER PUBLICATIONS

"Automatic Named Ranges", http://www/excel-erate.biz/excel/names_automatic.htm, downloaded Apr. 26, 2016 (3 pages).

* cited by examiner

| OrderDate | Region | Rep | Item | Units | Cost | Total |
|---|---|---|---|---|---|---|
| 06/01/2014 | East | Jones | Pencil | 95 | 2 1.91 | 181.45 |
| 23/01/2014 | Central | Kivell | Binder | 50 | 1 19.96 | 997.50 |
| 09/02/2014 | Central | Jardine | Pencil | 36 | 1 4.91 | 176.76 |
| 26/02/2014 | Central | Gill | Pen | 27 | 1 19.31 | 537.57 |
| 15/03/2014 | West | Sorvino | Pencil | 56 | 1 2.95 | 165.20 |
| 01/04/2014 | East | Jones | Binder | 60 | 1 4.91 | 294.60 |
| 18/04/2014 | Central | Andrews | Pencil | 75 | 2 1.91 | 143.25 |
| 05/05/2014 | Central | Jardine | Pencil | 90 | 1 8.39 | 809.10 |
| → 1/05/2014 | West | Thompson | Pencil 1 | 32 | 5 1.91 | 1 61.12 |
| 08/06/2014 | East | Jones | Binder | 60 | 1 19.96 | 1197.60 |
| 25/06/2014 | Central | Morgan | Pencil | 90 | 1 1.39 | 179.10 |
| 12/07/2014 | East | Howard | Binder | 29 | 1 19.99 | 579.71 |
| 29/07/2014 | East | Parent | Binder | 81 | 1 18.99 | 1538.19 |
| 15/08/2014 | East | Jones | Pencil | 35 | 2 1.91 | 66.85 |
| 01/09/2014 | Central | Smith | Desk | 2 | 1 125 | 250.00 |
| 18/09/2014 | East | Jones | Pen set | 16 | 1 4.91 | 78.58 |
| 05/10/2014 | Central | Morgan | Binder | 28 | 1 19.96 | 558.60 |
| 22/10/2014 | East | Jones | Pen | 64 | 1 19.31 | 1274.24 |
| 08/11/2014 | East | Parent | Pen | 15 | 1 19.91 | 298.65 |
| 25/11/2014 | Central | Kivell | Pen set | 96 | 1 4.91 | 471.38 |
| 12/12/2014 | Central | Smith | Pencil | 67 | 1 1.25 | 83.75 |

FIG. 5

| OrderDate | Region | Rep | Item | Units | Cost | Total |
|---|---|---|---|---|---|---|
| 06/01/2014 | East | Jones | Pencil | 95 | 1.91 | 181.45 |
| 23/01/2014 | Central | Kivell | Binder | 50 | 19.95 | 997.50 |
| 09/02/2014 | Central | Jardine | Pencil | 36 | 4.91 | 176.76 |
| 26/02/2014 | Central | Gill | Pen | 27 | 19.91 | 537.57 |
| 15/03/2014 | West | Sorvino | Pencil | 56 | 2.95 | 165.20 |
| 01/04/2014 | East | Jones | Binder | 60 | 4.91 | 294.60 |
| 18/04/2014 | Central | Andrews | Pencil | 75 | 1.91 | 143.25 |
| 05/05/2014 | Central | Jardine | Pencil | 90 | 8.99 | 809.10 |
| 12/05/2014 | West | Thompson | Pencil | 32 | 1.91 | 61.12 |
| 08/06/2014 | East | Jones | Binder | 60 | 19.95 | 1197.00 |
| 25/06/2014 | Central | Morgan | Pencil | 90 | 1.99 | 179.10 |
| 12/07/2014 | East | Howard | Binder | 29 | 19.99 | 579.71 |
| 29/07/2014 | East | Parent | Binder | 81 | 19.99 | 1538.19 |
| 15/08/2014 | East | Jones | Pencil | 35 | 1.91 | 66.85 |
| 01/09/2014 | Central | Smith | Desk | 2 | 125 | 250.00 |
| 18/09/2014 | East | Jones | Pen set | 16 | 4.91 | 78.56 |
| 05/10/2014 | Central | Morgan | Binder | 28 | 19.95 | 558.60 |
| 22/10/2014 | East | Jones | Pen | 64 | 19.91 | 1274.24 |
| 08/11/2014 | East | Parent | Pen | 15 | 19.91 | 298.65 |
| 25/11/2014 | Central | Kivell | Pen set | 96 | 4.91 | 471.36 |
| 12/12/2014 | Central | Smith | Pencil | 67 | 1.25 | 83.75 |

| OrderDate | Region | Rep | Item | Units | Cost | Total |
|---|---|---|---|---|---|---|
| 06/01/2014 | East | Jones | Pencil | 95 | 1.91 | 181.45 |
| 23/01/2014 | Central | Kivell | Binder | 50 | 19.95 | 997.50 |
| 09/02/2014 | Central | Jardine | Pencil | 36 | 4.91 | 176.76 |
| 26/02/2014 | Central | Gill | Pen | 27 | 19.91 | 537.57 |
| 15/03/2014 | West | Sorvino | Pencil | 56 | 2.95 | 165.20 |
| 01/04/2014 | East | Jones | Binder | 60 | 4.91 | 294.60 |
| 18/04/2014 | Central | Andrews | Pencil | 75 | 1.91 | 143.25 |
| 05/05/2014 | Central | Jardine | Pencil | 90 | 8.99 | 809.10 |
| 12/05/2014 | West | Thompson | Pencil | 32 | 1.91 | 61.12 |
| 08/06/2014 | East | Jones | Binder | 60 | 19.95 | 1197.00 |
| 25/06/2014 | Central | Morgan | Pencil |  | .99 | 179.10 |
| 12/07/2014 | East | oward | Binder | 29 | .99 | 579.71 |
| 29/07/2014 | East | Parent | Binder | 81 | 8.99 | 1538.19 |
| 15/08/2014 | East | Jones | Pencil | 35 | 1.91 | 66.85 |
| 01/09/2014 | Central | Smith | Desk | 2 | 125 | 250.00 |
| 18/09/2014 | East | Jones | Pen set | 16 | 4.91 | 78.56 |
| 05/10/2014 | Central | Morgan | Binder | 28 | 19.95 | 558.60 |
| 22/10/2014 | East | Jones | Pen | 64 | 19.91 | 1274.24 |
| 08/11/2014 | East | Parent | Pen | 15 | 19.91 | 298.65 |
| 25/11/2014 | Central | Kivell | Pen set | 96 | 4.91 | 471.36 |
| 12/12/2014 | Central | Smith | Pencil | 67 | 1.25 | 83.75 |

FIG. 7

| OrderDate | Region | Rep | Item | Units | Cost | Total |
|---|---|---|---|---|---|---|
| 06/01/2014 | East | Jones | Pencil | 95 | 1.91 | 181.45 |
| 23/01/2014 | Central | Kivell | Binder | 50 | 19.95 | 997.50 |
| 09/02/2014 | Central | Jardine | Pencil | 36 | 4.91 | 176.76 |
| 26/02/2014 | Central | Gill | Pen | 27 | 19.91 | 537.57 |
| 15/03/2014 | West | Sorvino | Pencil | 56 | 2.95 | 165.20 |
| 01/04/2014 | East | Jones | Binder | 60 | 4.91 | 294.60 |
| 18/04/2014 | Central | Andrews | Pencil | 75 | 1.91 | 143.25 |
| 05/05/2014 | Central | Jardine | Pencil | 90 | 8.99 | 809.10 |
| 12/05/2014 | West | Thompson | Pencil | 32 | 1.91 | 61.12 |
| 08/06/2014 | East | Jones | Binder | 60 | 19.95 | 1197.00 |
| 25/06/2014 | Central | Morgan | Pencil | 90 | 1.99 | 179.10 |
| 12/07/2014 | East | Howard | Binder | 29 | 19.99 | 579.71 |
| 29/07/2014 | East | Parent | Binder | 81 | 19.99 | 1538.19 |
| 15/08/2014 | East | Jones | Pencil | 35 | 1.91 | 66.35 |
| 01/09/2014 | Central | Smith | Desk | 2 | 125 | 250.00 |
| 18/09/2014 | East | Jones | Pen set | 16 | 4.91 | 78.56 |
| 05/10/2014 | Central | Morgan | Binder | 28 | 19.95 | 558.60 |
| 22/10/2014 | East | Jones | Pen | 64 | 19.91 | 1274.24 |
| 08/11/2014 | East | Parent | Pen | 15 | 19.91 | 298.65 |
| 25/11/2014 | Central | Kivell | Pen set | 96 | 4.91 | 471.36 |
| 12/12/2014 | Central | Smith | Pencil | 67 | 1.25 | 83.75 |

FIG. 8

TABULATED DATA SELECTION

BACKGROUND

The ability of being able to work on the move is increasingly desirable in modern society. This has led to the advent of portable communication devices such as smart phones and tablet computers, which increasingly aim to offer similar functionality as for instance desktop computers, such that users of such portable communication devices are empowered to perform many tasks when away from their desks. For example, in a business environment, entrepreneurs, enterprises or their employees may utilize such portable communication devices for the purpose of offering or conducting commercial transactions independent of their location.

However, portable communication devices typically offer a different type of user interaction compared to, for instance, a desktop computer. Specifically, portable communication devices are typically operated through a touchscreen, rather than a combination of keyboard and mouse for example. This can be detrimental to the user experience when running applications that are optimized for use with such combinations of more traditional user interfaces.

For example, when trying to manipulate tabulated data, e.g. data in a spreadsheet, a user may find such manipulations particularly cumbersome on a touchscreen, as for instance navigation and selection of desired fields in the tabulated data is more involved. Selection of data may require long-pressing a data cell in order to activate the cell selection markers at the edge of the selected data cell, after which the markers need to be dragged over the area of the tabulated data to be selected, for example, in order to facilitate copying of the data. This is rather cumbersome, error-prone and does not allow for selection of non-contiguous data. The selection process of such data is even more involved.

US 2014/0372854 A1 discloses a smart selection engine that may run in the context of a spreadsheet application. The smart selection engine reduces the cognitive load and complexity for performing spreadsheet operations by presenting the user with easy to use and understand options that are big, simple, and lend themselves to natural user interfaces, touch enabled devices, and devices with small displays as well as with graphical user interfaces, larger displays, and traditional input devices. By making contextually based suggestions, the smart selection engine reduces or eliminates the need for the user to be aware of the available operations or how to perform the operations. This solution aids the user in selecting the appropriate data in a spreadsheet for instance. However, it does not necessarily reduce the user interaction required to select the desired data.

SUMMARY

The present invention provides a computer-implemented method, computer program product, and computer system for selecting tabulated data in which the required amount of user interaction with a user interface such as a touchscreen is reduced.

According to an aspect, there is provided a computer-implemented method of selecting tabulated data, the method including displaying a tabulated data structure on a computer display, the tabulated data structure including a plurality of data fields; receiving a user input indicative of a selection of one of the data fields; searching the tabulated data structure to generate at least one set of data fields, the data fields in each set sharing a relationship with the user-selected data field; and highlighting the at least one set of data fields in the displayed tabulated data structure, in which each of the highlighted sets of data fields is user-selectable.

One or more embodiments of the present invention are based on the insight that data in tabulated data structures, for example, tables and in particular spreadsheets, is interrelated, and that users attempting to select a subset of data fields, for example, cells, in the tabulated data structure typically do so to select such interrelated data, for instance, related data in certain rows or columns. This may be exploited such that a user selecting a single data field, for instance, by touching a corresponding region of a touchscreen, may be presented with one or more data field selections, that is, sets of data fields for which a relationship with the user-selected data field, such that the user may simply select such a highlighted set of data fields without having to individually select all the data fields in such a set, thereby significantly reducing the required user interaction with the tabulated data structure. This is particularly advantageous when the tabulated data structure is displayed on a touchscreen although embodiments are not limited thereto. Rather, a tabulated data structure may be displayed on any type of display device on which a data field may be selected in any suitable manner, for example, using a mouse-controlled cursor or the like.

In an embodiment, receiving a user input indicative of a selection of one of the data fields includes receiving a plurality of user inputs each indicative of a selection of a different one of the data fields, the plurality of user inputs defining a region of the tabulated data structure including a subset of the plurality of data fields; and searching the tabulated data structure to generate the at least one set of data fields includes identifying data fields in the tabulated data structure sharing a relationship with at least one of the data fields in the subset. For example, searching the tabulated data structure to generate the at least one set of data fields may include identifying data fields in the tabulated data structure sharing the relationship with all of the data fields in the subset.

The provision of multiple user inputs, for example, activation points in different regions of the tabulated data structure may facilitate an improved analysis of the data fields in the tabulated data structure as more than one user-selected field may be considered in the analysis. For example, the analysis may be based on the data fields coinciding with the intersection of the provided user inputs or the data fields coinciding with the union of the provided user inputs. Consequently, the user may select multiple data fields on which the selection of related data fields is to be based in a simple and straightforward manner.

The computer-implemented method may further include receiving at least one further user input indicative of a selection of a highlighted set of data fields in the displayed tabulated data structure; and copying the selected highlighted set of data fields to a clipboard of the computer such that the user may export the selected set of data fields to another application, for example, another tabulated data structure.

Advantageously, receiving a user input indicative of a selection of one of the data fields may include detecting a touch in a region of a touchscreen on which the tabulated data structure is displayed, the method further including identifying the data field selected by the user from the region in which the touch is detected. In particular touchscreen-based computer systems, e.g. smart phones, tablet computers and the like, will benefit from embodiments of the present invention due to the improvement in ease of data field selection.

In an embodiment, searching the tabulated data structure to generate at least one set of data fields, the data fields in each set sharing a relationship with the user-selected data field includes determining a similarity score for each data field in the tabulated data structure expressing a similarity between the data field and the user-selected data field; and generating the set of data fields based on the determined similarity scores. Such similarity scores may be advantageously used to identify data fields that may be grouped in a single set, i.e. data fields sharing the same relationship with the user-selected data field.

Each data field may include a set of attributes, in which determining a similarity score for each data field in the tabulated data structure expressing a similarity between the data field and the user-selected data field may include determining an aggregate similarity score by summing individual similarity scores, each individual similarity score being determined based on a similarity between an attribute of the data field and an attribute of the user-selected data field. Such attributes may assist in determining a relationship between the user-selected data field (or a further data field in the group of data fields to which the user-selected data field belongs) by identifying data fields that have multiple attributes in common with the user-selected data field, for example, position in the tabulated data structure, data field type, data field value, data field format and so on.

The set of attributes may include a first attribute being the position of the data field in the tabulated data structure and a second attribute being at least one of: a data type of the data field; a formula in the data field and a data value in the data field, in which determining an aggregate similarity score by summing individual similarity scores, each individual similarity score being determined based on a similarity between an attribute of the data field and an attribute of the user-selected data field may include assigning a first individual similarity score based on a similarity between the first attribute of the data field and the first attribute of the user-selected data field; and assigning a second individual similarity score based on a similarity between the second attribute of the data field and the second attribute of the user-selected data field; the first individual similarity score being higher than the second individual similarity score. By using different weights for different types of attributes, a set of data fields may be generated in which the data fields have a particularly high probability of sharing the same relationship with the user-selected data field.

According to another aspect, there is provided a computer program product including a computer readable storage medium having computer readable program instructions embodied therewith for, when executed on a processing arrangement of a computer system causing the processing arrangement to display a tabulated data structure on a computer display, the tabulated data structure including a plurality of data fields; and, in response to receiving a user input indicative of a selection of one of the data fields: search the tabulated data structure to generate at least one set of data fields, the data fields in each set sharing a relationship with the user-selected data field; and highlight the at least one set of data fields in the displayed tabulated data structure, in which each of the highlighted sets of data fields is user-selectable. Such a computer program product may be installed on a computer system, such as on a touchscreen-based computer system to improve ease of user interaction with the computer system, in particular when selecting data fields from tabulated data structures.

In an embodiment, the computer readable program instructions may further enable the processing arrangement to receive a plurality of user inputs each indicative of a selection of a different one of the data fields, the plurality of user inputs defining a region of the tabulated data structure including a subset of the plurality of data fields; and search the tabulated data structure to generate the at least one set of data fields includes identifying data fields in the tabulated data structure sharing a relationship with at least one of the data fields in the subset. For example, the computer readable program instructions may cause the processing arrangement to identify data fields in the tabulated data structure sharing the relationship with all of the data fields in the subset.

The computer readable program instructions may further cause the processing arrangement to, in response to receiving at least one further user input indicative of a selection of a highlighted set of data fields in the displayed tabulated data structure, copy the selected highlighted set of data fields to a clipboard of the computer.

Advantageously, the computer readable program instructions may also cause the processing arrangement to receive a user input indicative of a selection of one of the data fields by detecting a touch in a region of a touchscreen on which the tabulated data structure is displayed; and identify the data field selected by the user from the region in which the touch is detected.

In an embodiment, the computer readable program instructions may cause the processing arrangement to, when searching the tabulated data structure to generate at least one set of data fields, the data fields in each set sharing a relationship with the user-selected data field, determine a similarity score for each data field in the tabulated data structure expressing a similarity between the data field and the user-selected data field; and generate the set of data fields based on the determined similarity scores.

Each data field may include a set of attributes, in which the computer readable program instructions may cause the processing arrangement to determine a similarity score for each data field in the tabulated data structure expressing a similarity between the data field and the user-selected data field by determining an aggregate similarity score by summing individual similarity scores, each individual similarity score being determined based on a similarity between an attribute of the data field and an attribute of the user-selected data field.

The set of attributes may include a first attribute being the position of the data field in the tabulated data structure and a second attribute being at least one of: a data type of the data field; a formula in the data field and a data value in the data field, and the computer readable program instructions may cause the processing arrangement to determine an aggregate similarity score by summing individual similarity scores, each individual similarity score being determined based on a similarity between an attribute of the data field and an attribute of the user-selected data field of the further data field includes: assigning a first individual similarity score based on a similarity between the first attribute of the data field and the first attribute of the user-selected data field; and assigning a second individual similarity score based on a similarity between the second attribute of the data field and the second attribute of the user-selected data field; the first individual similarity score being higher than the second individual similarity score.

According to yet another aspect, there are provided herein computer systems relating to one or more aspects of the present invention, and implementing, for instance, the above-summarized methods and/or computer program products.

BRIEF DESCRIPTION OF THE DRAWINGS

Embodiments of the present invention are described below, by way of example only, with reference to the drawings, in which:

FIG. 2 schematically depicts a user interaction with a tabulated data structure displayed on a computer system, in accordance with one or more aspects of the present invention;

FIG. 5 schematically depicts an aspect of a method, in accordance with one or more aspects of the present invention;

FIG. 6 schematically depicts a tabulated data structure displayed on a computer system as generated by a method, in accordance with one or more aspects of the present invention;

FIG. 7 schematically depicts a further user interaction with a tabulated data structure displayed on a computer system, in accordance with one or more aspects of the present invention; and FIG. 8 schematically depicts a tabulated data structure displayed on a computer system as generated by a method, in accordance with one or more aspects of the present invention.

DETAILED DESCRIPTION

Figure 1:
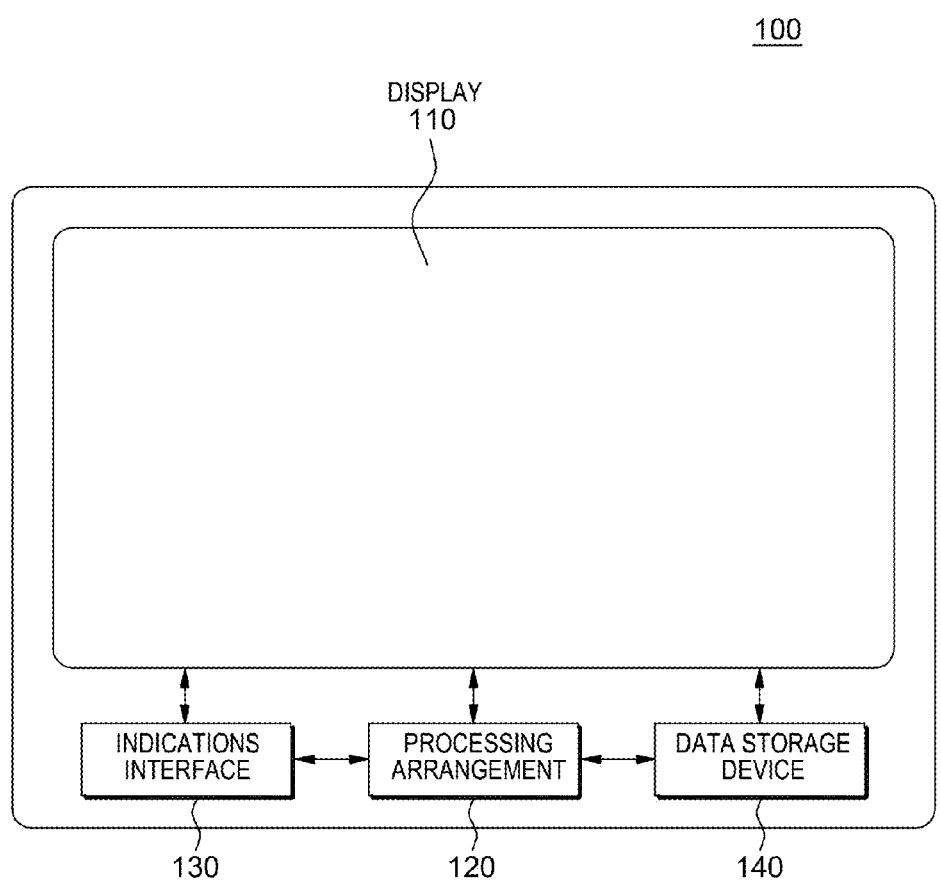
FIG. 1 schematically depicts a computer system according to one or more aspects of the present invention.

It should be understood that the figures are merely schematic and are not drawn to scale. It should also be understood that the same reference numerals used throughout different figures indicate the same or similar parts.

In the context of the present application, where embodiments of the present invention constitute a method, it should be understood that such a method is a process for execution by a computer system, i.e. is a computer-implementable method. The various steps of the method therefore reflect various parts of a computer program, e.g. various parts of one or more processes, modules, instruction sets, etc.

FIG. 1 schematically depicts a computer system 100 according to an example embodiment. The computer system 100 includes a display 110 under control of a processing arrangement 120. The display 110 may be any suitable display device such as a display device integral to a housing of the computer system 100, such as for example a touchscreen. In such an embodiment, the touchscreen sensitivity may be segmented into a plurality of regions sensitive to touch, such that upon one of the regions being touched by a user, the processing arrangement 120 may interpret the registered touch as a particular control instruction of the computer system 100, as is well-known. Any suitable touchscreen technology may be used in this embodiment. However, in alternative embodiments, the display 110 may be a discrete device in its own housing, e.g. a monitor or the like, which discrete device may be a touchscreen or may be a passive display device, i.e. insensitive to touch, in which case regions of the display 110 may be selected or activated using one or more peripheral user interface devices such as for example a keyboard, a mouse, a trackball, a microphone for registering voice commands (in which case the processing arrangement 120 may be adapted to run speech recognition algorithms for recognizing the registered voice commands). Many other suitable user interface devices will be apparent to the skilled person. As such user control is well-known, this will not be explained in further detail for the sake of brevity only.

The processing arrangement 120 may include any suitable number and type of processors, e.g. a CPU optionally supported by a GPU, which processors may have any suitable architecture, e.g. a generic processor having any suitable number of cores, an ASIC, and so on. In an embodiment, the computer system 100 may be a stand-alone device in the sense that all computational operations may be executed by the processing arrangement 120. In an alternative embodiment, at least some of the computational operations (as will be explained in more detail below) may be executed by a remote processing arrangement, for instance, a network-accessible service such as an Internet service or the like. To this end, the processing arrangement 120 may be arranged to communicate with the remote processing arrangement over a wired or wireless network, for example, a mobile communications network, a local area network, the Internet, etc., through a communications interface 130 communicatively coupled to the processing arrangement 120, for example, a wireless configurations interface such as a Wi-Fi or Bluetooth interface, a wired network interface such as an Ethernet interface, and so on.

The computer system 100 may further include a computer readable storage medium such as a data storage device 140, for instance, a suitable type of memory such as a RAM or Flash memory, a magnetic disk, a solid state disk, an optical disk, and so on communicatively coupled to the processing arrangement 120, for example, through a P2P connection, a bus architecture, or the like, with the processing arrangement 120 adapted to retrieve computer readable program instructions from the data storage device 140 in order to execute these instructions. In an embodiment, the data storage device 140 may embody a computer program product storing computer readable program instructions that, when executed on the processing arrangement 120, cause the processing arrangement 120 to implement one or more aspects of a method in accordance with the present invention, as will be explained in more detail below. Alternatively, at least part of the data storage device 140 may be a distributed data storage device such as a network-accessible storage device such as a storage area network, network-attached storage, cloud storage, and so on, in which case the processing arrangement 120 may be adapted to access the network-accessible storage device through the indications interface 130.

In one embodiment, the computer system 100 may be a portable computer system such as a tablet computer, a laptop or a smart phone, in which case the display 110 may be a touchscreen. However, it should be understood that embodiments of the present invention are not limited to such a portable computer systems; for example, the computer system 100 may be a personal computer, a desktop station connected to a server, e.g. a thin client or the like, in which case the display 110 is not necessarily a touchscreen as previously explained. Moreover, although in some embodiments the processing arrangement 120 is adapted to implement embodiments of a method of the present invention by execution of appropriate computer readable program instructions, in alternative embodiments the processing arrangement 120 may be hard-coded to implement one or more embodiments of the method of the present invention, e.g. the processing arrangement 120 may include an ASIC designed to implement such embodiments.

As noted, the present invention may be a (computer) system, a method, and/or a computer program product. The computer program product may include a computer readable storage medium (or media) having computer readable program instructions thereon for causing a processor to carry out aspects of the present invention.

Figure 2:
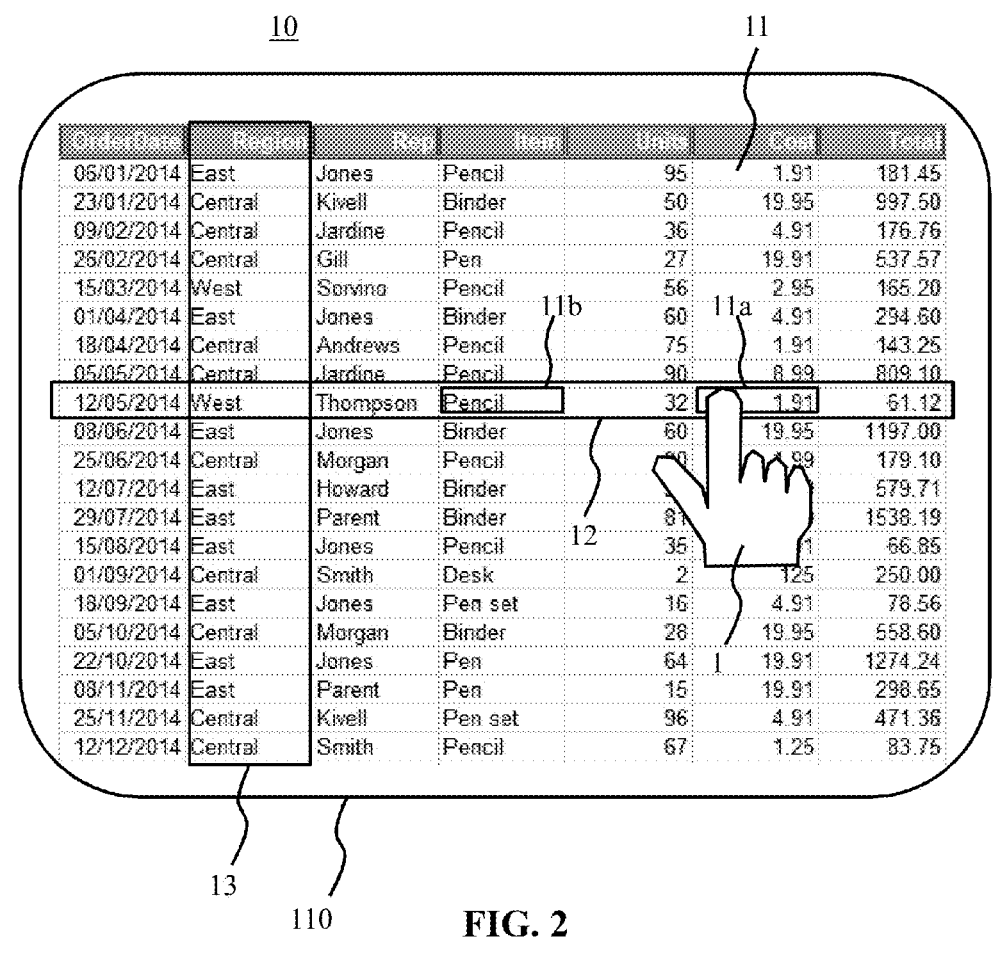

FIG. 2 schematically depicts a tabulated data structure 10, e.g. a table or spreadsheet, displayed on the display 110 of the computer system. Such a tabulated data structure 10 may comprise one or more layers or sheets, each including a plurality of data fields 11, for example, cells, organized in a grid or matrix of rows 12 and columns 13. A particular row 12 or column 13 may define a data group, i.e. a grouping of data fields 11 that define a single entry in the tabulated data structure 10, e.g. in case of the tabulated data structure 10 implementing a database or the like. For example, in a traditional database each row 12 may define a database entry, whereas in a columnar database each column 13 may define a database entry. Such a grouping therefore includes a plurality of data fields belonging to the same entry, as symbolized in FIG. 2 by data field 11a and data field 11b in the highlighted row 12. Each data field 11 may be characterized by a set of attributes, such as position (row X, column Y) in the tabulated data structure 10, type of the data field (e.g. text, number, currency, formula, and so on), value of the data field, etcetera. For example, in FIG. 2 data field 11a is a currency data field (cost in USD) and data field 11b is a text data field (Sales region in USA).

Such tabulated data structures 10 may contain large volumes of data, and in a common use case of such tabulated data structures 10 a user may wish to select a subset of the data from the tabulated data structure 10, for example, for populating a further tabulated data structure 10, for presentation purposes, and so on. Such a use case for example may occur where the tabulated data structure 10 comprises data having a plurality of interrelations, for instance, multiple subsets of related data fields 11, in which case the user may be interested in selecting data obeying a particular relation, for example data pertaining to the sale of pencils in the USA as in the example tabulated data structure 10 in FIG. 2. Where the tabulated data structure 10 contains multiple data fields 11, e.g. multiple groupings of data fields, e.g. rows 12, a user may have to provide multiple selection commands via a user interface, which may be perceived as cumbersome, even on computer systems containing multiple user interfaces, e.g. a mouse and keyboard, where combinations of commands may facilitate relatively powerful data field selection commands.

The cumbersome nature of such data selection is even more pronounced on touchscreen devices, where special commands are required to select data. For example, a user may have to touch a location of the touchscreen corresponding to a data field 11 to be selected for a certain period of time to activate a selection command, e.g. a scalable box that may be dragged over an area of the touchscreen to be selected in order to select a cluster of data fields in the tabulated data structure 10. Not only is this rather involved, but is also does not facilitate the selection of non-contiguous data fields, e.g. spatially separated data fields or data field groupings, e.g. rows or columns, for which even more involved command sequences may be necessary, if such command sequences are at all available.

Embodiments of the present invention automate the selection of multiple data fields 11 in a tabulated data structure 10 based on the selection of one or more data fields 11a by the user in the tabulated data structure 10. To this end, at least some embodiments rely on the deployment of a process that identifies and evaluates a user-selected data field 11a, for example, by evaluating the attributes of the user-selected data field, and systematically evaluates the remaining data fields 11 in the tabulated data structure 10 to identify candidate data fields 11 that may be related to the user-selected data field 11a. Such a computer-implemented method of selecting tabulated data based on a user-selected data field 11a may form part of the operating system of the computer system or alternatively may for part of a software program in which the tabulated data structure 10 is generated, e.g. a spreadsheet program or database management program.

The data field selection method according to embodiments of the present invention may continuously enabled in an operating system or software package or alternatively may be user-enabled, e.g. by activating the method using a specific command, selecting the method in a ribbon, pop-up window, drop-down menu or the like, or automatically activated, e.g. when the tabulated data structure 10 exceeds a defined complexity, e.g. a total number or data fields 11, rows 12 and/or columns 13 for example.

Figure 3:
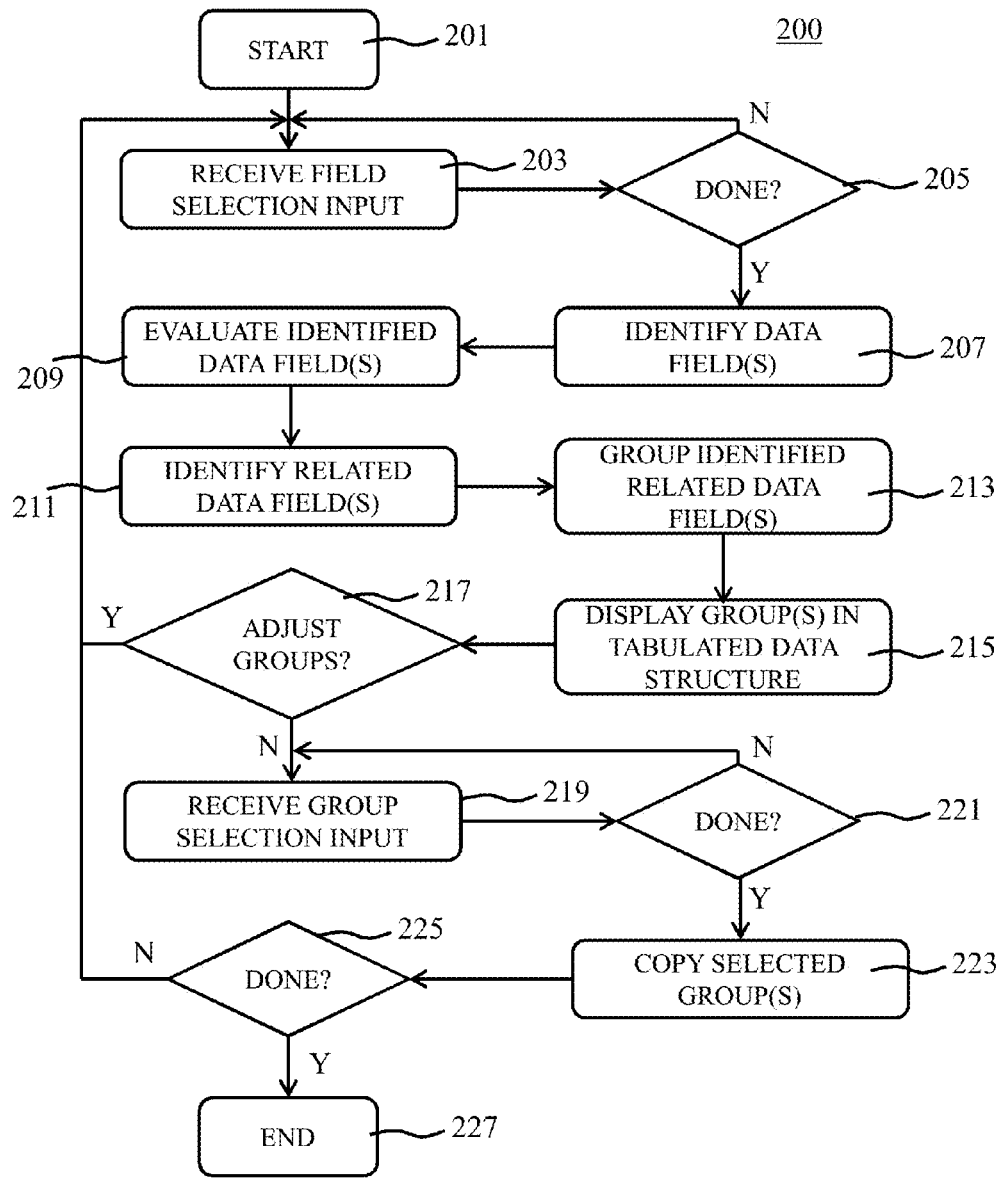
FIG. 3 is a flowchart of one embodiment of a method, in accordance with one or more aspects of the present invention.

An example embodiment of an automated data field selection method 200 is schematically depicted in FIG. 3. Referring collectively to FIGS. 1-3, the method 200 starts in 201, for instance, by launching an application such as an operating system or software program containing the method 200 or by enabling the method 200 as explained above, which further includes displaying the tabulated data structure 10 on the computer display 100. In 203, the method 200 receives a user input indicative of a selection of one of the data fields 11, e.g. a selection of a data field 11a by a stimulus 1 as schematically depicted in FIG. 2. Such a stimulus or user input may be provided in any suitable manner, e.g. by a user selecting the data field 11a using a mouse or the like, although in a particularly advantageous embodiment, the user input 1 may be provided by the user touching a region of a touchscreen display 110 in which the data field 11a is displayed, in which case the method 200 may further include identifying the data field 11a selected by the user from the region of the touchscreen display 110 in which the touch is detected, e.g. using the user interface API or in any other suitable manner.

In order to distinguish between a routine selection of the data field 11a, for instance to manipulate the data in this data field and a selection of the data field 11a for the purpose of invoking related data field search of the method 200, the user may be required to select the data field 11a in a particular manner, e.g. by holding the region of the touchscreen display 110 corresponding to the data field 11a for a predetermined period of time, by double-clicking or right-clicking the data field 11a with a mouse, and so on. Any suitable 'special' command may be used for this purpose.

In an embodiment, which will be explained in more detail below, the user may select a number of data fields 11a, for example, to find data fields 11 or groupings of data fields 11 that share a relationship with at least one of the user-selected number of data fields. For example, the user may select multiple data fields 11a belonging to the same grouping, for instance, the same row 12 or column 13, in order to find other groupings that share the same data field types or data field values. In such a multi-selection mode, the method 200 may check in step 205 if the user has selected all data fields 11a, for example, by determining if a user command indicative of the completion of such a selection has been received. If this is not the case, the method 200 may revert back to step 203 to receive the user selection of the next data field 11a; otherwise, the method 200 may proceed in step 207 in which the selected one or more data fields 11a are identified, for example, by correlating a touched region of a touchscreen display 110 with a particular data field 11 as explained above.

In step 209, the method 200 may evaluate the selected one or more data fields 11a to determine the attributes of the data field, e.g. its position in the tabulated data structure 10, its type, its value, its formula (if present), and so on. The determined attributes may be used by the method 200 to determine a relationship between the selected one or more data fields 11a and the remaining data fields 11 of the tabulated data structure 10 in 211. In this determination, the method 200 may find one or more sets of data fields 11 in the tabulated data structure 10 in which within a single set all data fields 11 share the same relationship with the user-selected one or more data fields 11a. To this end, a process may be deployed that searches the tabulated data structure 10 to generate such sets of data fields 11.

In an embodiment, such a process may award a weight factor or similarity score to each data field 11 in the tabulated data structure 10 based on a comparison between the data field 11 and the user-selected data field 11a, for instance, by evaluating and comparing respective attributes of the respective data fields. For example, data fields 11 forming part of the grouping of data fields to which the user-selected data field 11a belongs, that is, are spatially related to the user-selected data field 11a, for instance, e.g. belong to the same row 12 or column 13 as the user-selected data field 11a, may be given a higher similarity score than data fields 11 that are otherwise potentially related to the user-selected data field 11a, e.g. data fields 11 being of the same data type as the user-selected data field 11a, data fields 11 having the same data value as the user-selected data field 11a, data fields 11 being referenced in formula associated with the user-selected data field 11a, and so on. Data fields 11 sharing no attributes with the user-selected data field 11a may be given an even lower similarity score or weight factor, e.g. a weight factor of zero.

For example, in the example tabulated data structure 10 schematically depicted in FIG. 2, data fields 11 in the same row 12 or column 13 as the user-selected data field 11a may be given a particular similarity score A, data fields 11 sharing the same value as the user-selected data field 11a may be given a particular similarity score B and data fields 11 not sharing any attributes with the user-selected data field 11a may be given a particular similarity score C, in which A>B>C. In case of a user-selected data field 11a comprising a formula, e.g. C1=A1+B1 (in words: the value of the user-selected data field in column C and row 1 is the sum of the respective values in the data fields in column A and row 1 and column B and row 1), it is likely that data fields A1 and B1 are related to C1, which may be reflected in the similarity score awarded to the respective data fields A1 and B1. For example, in such a scenario the respective data fields A1 and B1 may be given a fractional similarity score that combines into a predefined similarity score, e.g. the formula A1+B1 is awarded the score (0.5)+(0.5)=1. The fractions F may be defined as F=SUM(F)/P, in which SUM(F) is the total number fractions in the formula and P is the predefined similarity score, such that in formulae having a large number of data fields, each individual data field may have a reduced similarity score compared to formulae having a smaller number of data fields, as in such large formulae the likelihood of a data field being similar to the user-selected data field 11a may be reduced.

Figure 4:
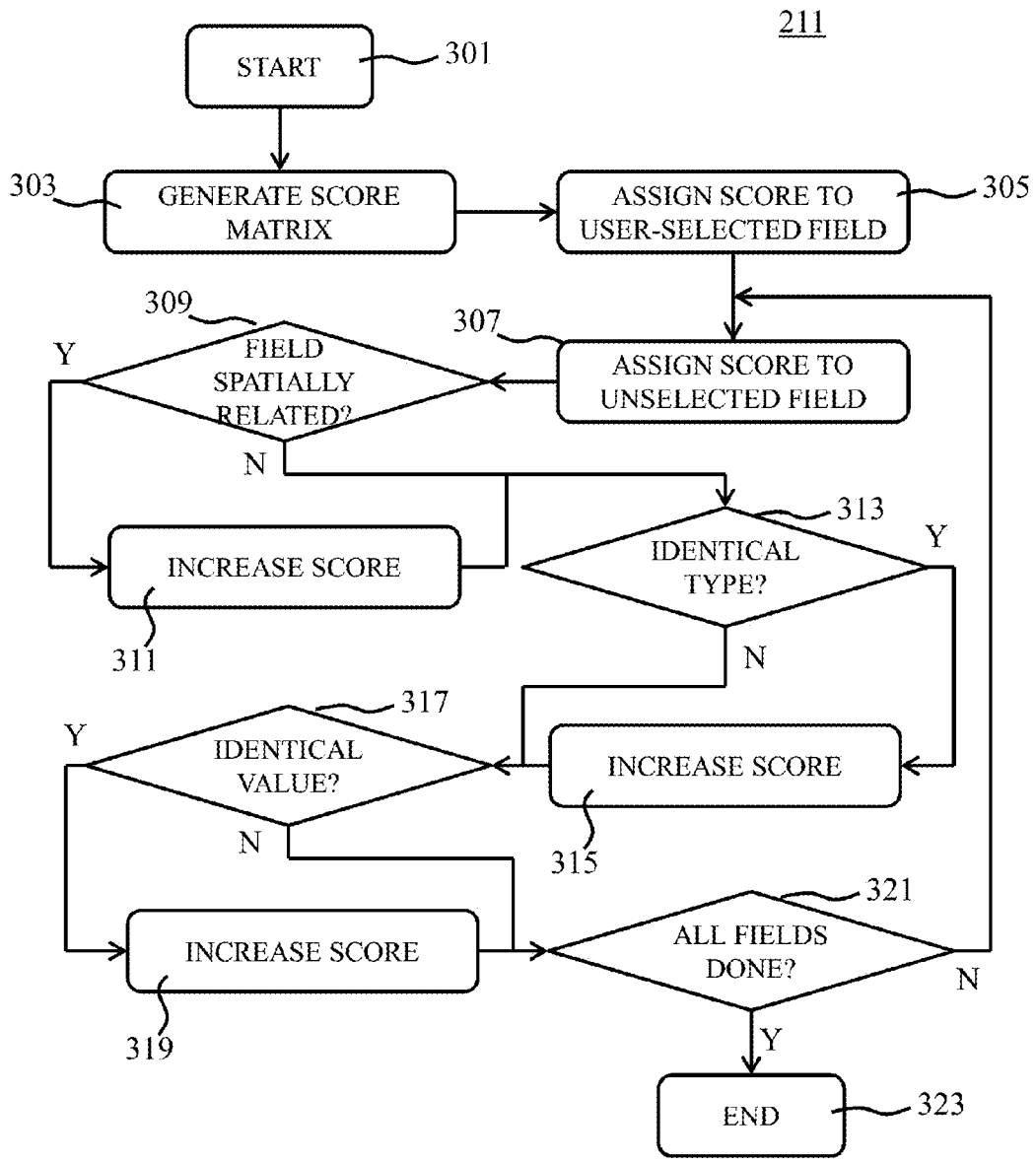
FIG. 4 is a flowchart of a further aspect of a method, in accordance with one or more aspects of the present invention.

An example embodiment of such a process to determine a relationship between the user-selected one or more data fields 11a and the remaining data fields 11 of the tabulated data structure 10 in 211 is schematically depicted by the flowchart of FIG. 4. Referring to FIGS. 2 & 4, the process starts in step 301, e.g. by receiving the relevant attributes of a user-selected data field 11a, after which the process may generate a score matrix in step 303 having dimensions (score fields organized in rows and columns) corresponding to the tabulated data structure 10 such that each score field corresponds to a data field 11 in the tabulated data structure 10. Such a score matrix 400 with score fields 401 is schematically depicted in FIG. 5. For the sake of clarity, the underlying tabulated data structure 10 corresponding to the score matrix 400 is also shown. The process may assign a default similarity score to the user-selected data field 11a (value 5 in example score matrix 400) although it is not necessary to assign a similarity score to the user-selected data field 11a, i.e. its similarity score may be left blank. It is further noted for the avoidance of doubt that in FIG. 5 a similarity score is shown only for data fields 11 that share at least one attribute with the user-selected data field 11a. This is for reasons of clarity only and should not be understood as the data fields 11 not being depicted with a similarity score not having been assigned such a score.

Based on the identified attributes of the user-selected data field 11a, the process may subsequently systematically compare the attributes of each data field 11 in the tabulated data structure 10 and increment or increase a default similarity score of the data field 11 under investigation, e.g. a default score of zero indicative of no potential similarity with the user-selected data field 11a, in case of a matching attribute. Such attribute matching may be case-insensitive, for example, in case of data in the form of text. The process may, in step 307, assign the default similarity score to the data field 11 under investigation before comparing each attribute of the user-selected data field 11a against the data field 11 under investigation to decide if the current similarity score to the data field 11 under investigation should be incremented.

By way of non-limiting example, the process may in step 309 determine if the data field 11 under investigation is spatially related to the user-selected data field 11a, for example, belongs to the same row or column as the user-selected data field 11a and increment the similarity score of the data field 11 under investigation by a first increment in step 311 if this is the case before checking in step 313 if the data field 11 under investigation is of the same data type as the user-selected data field 11a and increment the similarity score of the data field 11 under investigation by a second increment in step 315 if this is the case, after which the process may proceed to step 317 where it is checked if the data field 11 under investigation has the same data value as the user-selected data field 11a and increment the similarity score of the data field 11 under investigation by a third increment in step 319 if this is the case, and so on. In an embodiment, the first increment may be larger than both the second increment and the third increment, which may be identical in some embodiments. Further corresponding attributes, for example, data fields 11 referenced in a formula associated with the user-selected data field 11a may be assigned a similarity score in this manner, and it should be understood that the process may be adapted in any suitable manner; in other words, the above attributes used by the process for comparison purposes are given by way of non-limiting example only and any suitable selection of attributes may be evaluated by the process for comparison purposes.

Once all attributes of the data field 11 under investigation to be compared against the attributes of the user-selected data field 11a have been compared, the process may check in 321 if all data fields 11 of the tabulated data structure 10 have been evaluated in this manner. If this is not the case, the process may revert back to step 307 in which the next data field to be evaluated is selected and assigned the default similarity score as previously explained. Once all data fields 11 have been evaluated in this manner, the process may terminate in step 323.

As can be seen in FIG. 5, in this manner, a differentiation in the data fields 11 is obtained, for example, the data fields 11 in the same row 12 as the user-selected data field 11a all have the same similarity score, whereas the data fields 11 in the same column 13 as the user-selected data field 11a and having the same data value as the user-selected data field 11a are differentiated from the remaining data fields in this column by having a higher similarity score compared to these remaining data fields. This can be understood by these data fields sharing the same data value with the user-selected data field 11a relating to the same product ("Pencil" in the Item column) as the user-selected data field 11a, whereas the remaining data fields in this column relates to a different product (or the same product sold at a different price). This demonstrates that the described process, according to one or more aspects of the present invention, is capable of determining multiple relationships between the user-selected data field 11a and other data fields 11 in the tabulated data structure 10.

Upon returning to FIG. 3, once the similarity scores for the data fields 11 have been calculated, the method 200 proceeds to step 213 in which the method 200 groups data fields 11 that may share the same relationship with the user-selected data field 11a into sets of data fields for highlighting in the tabulated data structure 10. For example, in step 213 the method 200 may group data fields 11 having the same non-default similarity score or have a non-default similarity score within a standard deviation of a reference similarity score into a single set. Further considerations, for example, spatial relationship of the data fields 11 relative to the user-selected data field 11a may be factored in when compiling the respective sets of data fields 11. For example, the method 200 may define the row 12 and the column 13 to which the user-selected data field 11a belongs as respective sets, regardless of the similarity scores of the individual members of these sets. The method 200 may deploy a greedy selection routine to generate the respective sets of data fields 11. In an embodiment, the selection routine may be adjusted based on the number of data fields 11 in a particular set. For example, where this number exceeds a defined threshold, e.g. more than N data fields in a set, with N being a positive integer, the method 200 may narrow the selection criteria and re-run the selection routine in order to reduce the number of data fields 11 in the set. This for example may be achieved by narrowing the standard deviation criteria, excluding data fields 11 not sharing a particular attribute, e.g. a particular spatial relationship, with the user-selected data field 11a, and so on.

Upon generating the one or more sets of potentially related data fields 11, the method 200 proceeds to 215 in which the generated sets are displayed on the display 110 within the tabulated data structure 10 as highlighted user-selectable regions. An example of such a displayed tabulated data structure 10 is schematically depicted in FIG. 6, having a highlighted set 21 corresponding to the row 12 to which the user-selected data field 11a belongs, a highlighted set 23 corresponding to the column 13 to which the user-selected data field 11a belongs and a highlighted set 25 highlighting the data fields 11 in the columns 13 having the same value as the user-selected data field 11a. The highlighted sets may be made distinguishable from each other in any suitable manner, e.g. using different highlight colors for the different sets. Each set may be highlighted in any suitable manner, e.g. using a border around the data fields 11 or group of data fields 11 belonging to the same set, with different borders being given different colors to distinguish different sets from each other. Other suitable ways of highlighting the one or more sets of selected data fields 11 will be apparent to the skilled person. It should be understood that such highlighted sets may not be restricted to the viewing area of the display 110 but may extend beyond this viewing area, e.g. may include data fields 11 outside the viewing area on the same sheet, may include data fields 11 outside the viewing area on a different sheet, and so on.

Next, it may be checked in step 217 if the one or more sets of data fields 11 need to be adjusted. For example, a user may provide a user instruction via any suitable user interface, e.g. a keyboard, a touchscreen which may be the same touchscreen on which the tabulated data structure 10 is displayed, or the like, indicative of the highlighted set(s) of data fields 11 comprising the selection of data fields 11 desired by the user. For example, in case of a touchscreen display 110, a dialogue window or the like may be displayed that facilitates the user to provide such an indication. In case the user does not require a recalculation of the sets of data fields 11, the user may select a highlighted set of data fields 11 in step 219, e.g. by clicking or touching the highlighted set. Optionally, it may be checked in step 221 if the user wishes to select multiple sets, e.g. by waiting for a defined period of time to determine if a further selection is made by the user or by communicating with the user through a dialogue window or the like asking the user if a further selection is to be made. If this is the case, the method 200 may revert back to step 219 to receive the further user selection, otherwise the method 200 may proceed to step 223 in which the one or more selected sets may be copied to the clipboard of the computer system 100 such that the user may paste the selected data fields 11 into a further application such as a further tabulated data structure, e.g. a further spreadsheet. Such a paste operation may be any suitable paste operation, e.g. a paste operation in which spaces between the data fields are removed to generate a contiguous dataset, a paste operation in which the original layout of the tabulated data structure 10 is retained, a paste operation in which only the values of the selected data fields 11 are retained, a paste operation in which the full functionality, e.g. defined formulae, of the selected data fields 11 in the tabulated data structure 10 is retained, and so on. However, such a copy operation is not always necessary; for example, the user may instead wish to select one or more of the highlighted sets of data fields 11 for formatting purposes, e.g. to distinguish the sets from the remainder of the tabulated data structure 10, e.g. by making the sets bold, giving the sets a different color, and so on, in which case the clipboard copy action may be skipped.

It is subsequently checked in step 225 if the user wishes to make a further data field selection. If this is the case, the method 200 reverts back to step 203 to receive a further user input selecting the next data field 11a based on which the further data field selection is to be based; otherwise, the method 200 terminates in step 227. Such a further data field selections for example may be made by the user to create a superset of data fields 11 in which multiple regions, e.g. non-contiguous rows or columns are compiled in this manner.

If it is determined in step 217 that the user wishes to refine the data field selections made by the method 200, the method may revert back to step 203 in which the user may identify at least one further data field based on which the sets of data fields 11 may be recalculated. Alternatively, as previously mentioned, the user may identify such further data fields upfront, for example where a user wants to obtain sets of data fields 11 in which the data fields 11 share an attribute with at least one of the selected data fields 11a, e.g. that share an attribute with all of the selected data fields 11a. For example, as schematically depicted in FIG. 7, the user may further select another data field 11c in the tabulated data structure 11 to obtain sets of data fields 11 comprising either an attribute of user-selected data field 11a or user-selected data field 11c or a set of data fields comprising a data field sharing at least one attribute with the user-selected data field 11a as well as sharing at least one attribute with the user-selected data field 11c.

For example, in the example tabulated data structure 10, the user may be interested in obtaining highlighted data fields all relating to items sold in the West of the USA in addition to obtaining highlighted data fields all relating to items sold for $1.91, the user may wish to filter the previously generated sets of data fields 11 by limiting the selected data fields to items sold in the West of the USA, the user may be interested in obtaining items sold for $1.91 in the West of the USA, and so on. In order to distinguish between the various scenarios, the user may be prompted by the method 200 to identify which scenario is applicable, e.g. to identify in a scenario where multiple data fields 11a, 11c have been user-selected, how this multiple selection should be interpreted, e.g. as a union of the user-selected data fields, as an intersection of the user-selected data fields, and so on.

The resulting sets of data fields 11 may be displayed on the display 110 as previously explained. For example, as schematically depicted in FIG. 8, where a user has indicated to be interested in a data field selection based on an intersection of the user-selected data fields 11a, 11c, the method 200 may generate a highlighted set 21 of data fields in which the original set contains rows of data fields (as defined by the intersection of user-selected data fields 11a and 11c) including the attribute "West". In this manner, a user may make complex selections of data fields 11 by providing only a small number of user inputs, thereby significantly improving the easy of user interaction between the user and the computer system 100, in particular a computer system 100 comprising a touchscreen display 110 as previously explained.

At this point, it is noted that when implemented on a computer system 100 such as depicted in FIG. 1, the processing arrangement 120 may execute the method 200 in its entirety or may devolve execution of e.g. computationally intensive parts of the method 200 such as the algorithm implementing the data field evaluation as exemplified by the example embodiment in FIG. 4 to a remote processing arrangement, e.g. through the communications interface 130. This may be advantageous in a scenario where the computer system 100 has limited processing power and/or in a scenario where the computer system 100 is battery-powered, e.g. to extend the operating time of the computer system 100 on a single battery charge.

Those skilled in the art will note from the above discussion that, provided herein in yet another aspect, are computer systems implementing, for instance, one or more aspects of the above-summarized methods and/or computer program products. The computer system(s) may include a display device, and a processing arrangement adapted to control the display device and to display a tabulated data structure on a computer display, the tabulated data structure including a plurality of data fields; and, in response to receiving a user input indicative of a selection of one of the data fields: search the tabulated data structure to generate at least one set of data fields, the data fields in each set sharing a relationship with the user-selected data field; and highlight the at least one set of data fields in the displayed tabulated data structure, in which each of the highlighted sets of data fields is user-selectable. Such a computer system is more user-friendly, in particular for selecting related data fields from tabulated data structures as the user does not have to select each member of the desired selection but instead the selection may be generated by the computer system in response to the user identifying as few as a single member of the desired selection using one or more evaluation processes using the user-selected data field(s) as input.

By way of example, the display device may be a touchscreen as such display devices benefit in particular from the improved user interaction with displayed tabulated data structures such as spreadsheets. In such an embodiment, the processing arrangement may be adapted to receive a user input indicative of a selection of one of the data fields by detecting a touch in a region of the touchscreen on which the tabulated data structure is displayed; and identify the data field selected by the user from the region in which the touch is detected.

Further, the processing arrangement may be adapted to receive a plurality of user inputs each indicative of a selection of a different one of the data fields, the plurality of user inputs defining a region of the tabulated data structure including a subset of the plurality of data fields; and search the tabulated data structure to generate the at least one set of data fields by identifying data fields in the tabulated data structure sharing a relationship with at least one of the data fields in said subset. For example, the processing arrangement may be adapted to identify data fields in the tabulated data structure sharing the relationship with all of the data fields in the subset.

The processing arrangement may be further adapted to, in response to receiving at least one further user input indicative of a selection of a highlighted set of data fields in the displayed tabulated data structure, copy the selected highlighted set of data fields to a clipboard of the computer.

In an embodiment, the processing arrangement may be adapted to, when searching the tabulated data structure to generate at least one set of data fields, the data fields in each set sharing a relationship with the user-selected data field, calculate a similarity score for each data field in the tabulated data structure expressing a similarity between the data field and the user-selected data field; and generate the set of data fields based on the calculated similarity scores.

Each data field may include a set of attributes, in which the processing arrangement may be adapted to determine a similarity score for each data field in the tabulated data structure expressing a similarity between the data field and the user-selected data field by determining an aggregate similarity score by summing individual similarity scores, each individual similarity score being determined based on a similarity between an attribute of the data field and an attribute of the user-selected data field.

The set of attributes may include a first attribute being the position of the data field in the tabulated data structure and a second attribute being at least one of: a data type of the data field; a formula in the data field and a data value in the data field, in which the processing arrangement adapted to determine an aggregate similarity score by summing individual similarity scores, each individual similarity score being determined based on a similarity between an attribute of the data field and an attribute of the user-selected data field may be adapted to assign a first individual similarity score based on a similarity between the first attribute of the data field and the first attribute of the user-selected data field; and assign a second individual similarity score based on a similarity between the second attribute of the data field and the second attribute of the user-selected data field; the first individual similarity score being higher than the second individual similarity score.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of facilitating processing within a computing device, the computer-implemented method comprising:
    displaying on a computer display of the computing device a tabulated data structure, the tabulated data structure comprising a plurality of data fields;
    receiving, by the computing device, a user input indicative of a selection of one of the data fields;
    searching, by the computing device, the tabulated data structure to generate at least one set of data fields having multiple data fields in the set, the data fields in each set being selected based on sharing a relationship with the user-selected data field; and
    highlighting, on the computer display of the computing device, the at least one set of data fields in the displayed tabulated data structure, in which the computing device provides each of the highlighted sets of data fields as a user-selectable set which allows a single selection of the user-selectable set to select all data fields in the user selectable set, the providing each highlighted set as a user-selectable set facilitating processing within the computing device.

2. The computer-implemented method of claim 1, wherein:
    receiving a user input indicative of a selection of one of the data fields comprises receiving a plurality of user inputs each indicative of a selection of a different one of the data fields, the plurality of user inputs defining a region of the tabulated data structure comprising a subset of the plurality of data fields; and
    searching the tabulated data structure to generate the at least one set of data fields comprises identifying data fields in the tabulated data structure sharing a relationship with at least one of the data fields in the subset.

3. The computer-implemented method of claim 2, wherein searching the tabulated data structure to generate the at least one set of data fields comprises identifying data fields in the tabulated data structure sharing the relationship with all of the data fields in the sub set.

4. The computer-implemented method of claim 1, further comprising:
    receiving at least one further user input indicative of a selection of a highlighted set of data fields in the displayed tabulated data structure; and
    copying the selected highlighted set of data fields to a clipboard of the computer.

5. The computer-implemented method of claim 1, wherein receiving a user input indicative of a selection of one of the data fields comprises detecting a touch in a region of a touchscreen on which the tabulated data structure is displayed, the method further comprising identifying the data field selected by the user from the region in which the touch is detected.

6. The computer-implemented method of claim 1, wherein searching the tabulated data structure to generate at least one set of data fields, the data fields in each set sharing a relationship with the user-selected data field comprises:
    determining a numerical similarity score for each data field in the tabulated data structure expressing a similarity between the data field and the user-selected data field in the grouping of data fields including the user-selected data field; and
    generate the set of data fields based on the determined numerical similarity scores.

7. The computer-implemented method of claim 6, wherein each data field comprises a set of attributes, and wherein determining a similarity score for each data field in the tabulated data structure expressing a similarity between the data field and the user-selected data field in the grouping of data fields including the user-selected data field comprises determining an aggregate similarity score by summing individual similarity scores, each individual similarity score being determined based on a similarity between an attribute of the data field and an attribute of the user-selected data field.

8. The computer-implemented method of claim 7, wherein the set of attributes includes a first attribute being the position of the data field in the tabulated data structure and a second attribute being at least one of: a data type of the data field; a formula in the data field and a data value in the data field, and wherein determining an aggregate similarity score by summing individual similarity scores, each individual similarity score being determined based on a similarity between an attribute of the data field and an attribute of the user-selected data field comprises:
    assigning a first individual similarity score based on a similarity between the first attribute of the data field and the first attribute of the user-selected data field; and
    assigning a second individual similarity score based on a similarity between the second attribute of the data field and the second attribute of the user-selected data field; the first individual similarity score being higher than the second individual similarity score.

9. A computer program product for facilitating processing within a computing device, the computer program product comprising:
    a computer readable storage medium having computer readable program instructions embodied therewith, the computer readable program instructions when executed on a processing arrangement causing the processing arrangement to:
        display, by the computing device, a tabulated data structure on a computer display of the computing device, the tabulated data structure comprising a plurality of data fields; and, in response to receiving a user input indicative of a selection of one of the data fields:
            search the tabulated data structure to generate at least one set of data fields having multiple data fields in the set, the data fields in each set sharing a relationship with the user-selected data field; and
            highlight the at least one set of data fields in the displayed tabulated data structure, in which the computing device provides each of the highlighted sets of data fields as a user-selectable set which allows a single selection of the user-selectable set to select all data fields in the user selectable set, the providing each highlighted set a user-selectable set facilitating processing within the computing device.

10. The computer program product of claim 9, wherein:
the computer readable program instructions further enable the processing arrangement to receive a plurality of user inputs each indicative of a selection of a different one of the data fields, the plurality of user inputs defining a region of the tabulated data structure comprising a subset of the plurality of data fields; and
search the tabulated data structure to generate the at least one set of data fields comprises identifying data fields in the tabulated data structure sharing a relationship with at least one of the data fields in the subset.

11. The computer program product of claim 10, wherein:
the computer readable program instructions further cause the processing arrangement to identify data fields in the tabulated data structure sharing the relationship with all of the data fields in the subset.

12. The computer program product of claim 9, wherein:
the computer readable program instructions further cause the processing arrangement to, in response to receiving at least one further user input indicative of a selection of a highlighted set of data fields in the displayed tabulated data structure, copy the selected highlighted set of data fields to a clipboard.

13. The computer program product of claim 9, wherein:
the computer readable program instructions further cause the processing arrangement to:
receive a user input indicative of a selection of one of the data fields by detecting a touch in a region of a touchscreen on which the tabulated data structure is displayed; and
identify the data field selected by the user from the region in which the touch is detected.

14. The computer program product of claim 9, wherein:
the computer readable program instructions further cause the processing arrangement to, when searching the tabulated data structure to generate at least one set of data fields, the data fields in each set sharing a relationship with the user-selected data field:
determine a numerical similarity score for each data field in the tabulated data structure expressing a similarity between the data field and the user-selected data field; and
generate the set of data fields based on the determined numerical similarity scores.

15. The computer program product of claim 14, wherein each data field comprises a set of attributes, and the computer readable program instructions further cause the processing arrangement to determine a similarity score for each data field in the tabulated data structure expressing a similarity between the data field and the user-selected data field of the further data field by determining an aggregate similarity score by summing individual similarity scores, each individual similarity score being determined based on a similarity between an attribute of the data field and an attribute of the user-selected data field.

16. The computer program product of claim 15, wherein the set of attributes includes a first attribute being the position of the data field in the tabulated data structure and a second attribute being at least one of: a data type of the data field; a formula in the data field and a data value in the data field, and wherein the computer readable program instructions further causes the processing arrangement to determine an aggregate similarity score by summing individual similarity scores, each individual similarity score being determined based on a similarity between an attribute of the data field and an attribute of the user-selected data field by:

assigning a first individual similarity score based on a similarity between the first attribute of the data field and the first attribute of the user-selected data field; and
assigning a second individual similarity score based on a similarity between the second attribute of the data field and the second attribute of the user-selected data field;
the first individual similarity score being higher than the second individual similarity score.

17. A computer system comprising:
a memory; and
a processing unit communicatively coupled with the memory, wherein the system performs a method comprising:
displaying a tabulated data structure on a computer display of the computer system, the tabulated data structure comprising a plurality of data fields;
receiving, by the computer system, a user input indicative of a selection of one of the data fields;
searching, by the computer system, the tabulated data structure to generate at least one set of data fields having multiple data fields in the set, the data fields in each set sharing a relationship with the user-selected data field; and
highlighting, by the computer system, the at least one set of data fields in the displayed tabulated data structure, in which the computer system provides each of the highlighted sets of data fields as a user-selectable set which allows a single selection of the user-selectable set to select all data fields in the user selectable set, the providing each highlighted set as a user-selected set facilitating processing within the computer system.

18. The computer system of claim 17, wherein the displaying is on a display device comprising a touchscreen.

19. The computer system of claim 18, wherein:
receiving a user input indicative of a selection of one of the data fields is by detecting a touch in a region of the touchscreen on which the tabulated data structure is displayed; and
identifying the data field selected by the user from the region in which the touch is detected.

20. The computer system of claim 17, wherein:
receiving a user input indicative of a selection of one of the data fields comprises receiving a plurality of user inputs each indicative of a selection of a different one of the data fields, the plurality of user inputs defining a region of the tabulated data structure comprising a subset of the plurality of data fields; and
searching the tabulated data structure to generate the at least one set of data fields comprises identifying data fields in the tabulated data structure sharing a relationship with at least one of the data fields in the subset.

21. The computer system of claim 20, wherein searching the tabulated data structure to generate the at least one set of data fields comprises identifying data fields in the tabulated data structure sharing the relationship with all of the data fields in the subset.

22. The computer system of claim 17, wherein in response to receiving at least one further user input indicative of a selection of a highlighted set of data fields in the displayed tabulated data structure, the method includes copying the selected highlighted set of data fields to a clipboard of the computer system.

23. The computer system of claim 17, wherein searching the tabulated data structure to generate at least one set of data fields, the data fields in each set sharing a relationship with the user-selected data field comprises:

determining a numerical similarity score for each data field in the tabulated data structure expressing a similarity between the data field and the user-selected data field; and
generating the set of data fields based on the calculated numerical similarity scores.

24. The computer system of claim 23, wherein each data field comprises a set of attributes, and determining a similarity score for each data field in the tabulated data structure expressing a similarity between the data field and the user-selected data field includes determining an aggregate similarity score by summing individual similarity scores, each individual similarity score being determined based on a similarity between an attribute of the data field and an attribute of the user-selected data field.

25. The computer system of claim 24, wherein the set of attributes includes a first attribute being the position of the data field in the tabulated data structure and a second attribute being at least one of: a data type of the data field; a formula in the data field and a data value in the data field, and wherein determining an aggregate similarity score by summing individual similarity scores, each individual similarity score being determined based on a similarity between an attribute of the data field and an attribute of the user-selected data field comprises:
assigning a first individual similarity score based on a similarity between the first attribute of the data field and the first attribute of the user-selected data field; and
assigning a second individual similarity score based on a similarity between the second attribute of the data field and the second attribute of the user-selected data field; the first individual similarity score being higher than the second individual similarity score.

* * * * *